(12) United States Patent
Kamata et al.

(10) Patent No.: US 9,196,191 B2
(45) Date of Patent: Nov. 24, 2015

(54) DRIVING DEVICE, ELECTRONIC DEVICE, AND DRIVE CONTROL PROGRAM

(71) Applicant: FUJITSU LIMITED, Kawasaki-shi, Kanagawa (JP)

(72) Inventors: Yuichi Kamata, Isehara (JP); Kiyoshi Taninaka, Ebina (JP); Yasuhiro Endo, Ebina (JP); Akihiko Yabuki, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/532,389

(22) Filed: Nov. 4, 2014

(65) Prior Publication Data

US 2015/0054808 A1    Feb. 26, 2015

Related U.S. Application Data

(63) Continuation of application No. PCT/JP2012/064939, filed on Jun. 11, 2012.

(51) Int. Cl.
| | |
|---|---|
| G09G 5/00 | (2006.01) |
| G09G 3/296 | (2013.01) |
| G06F 1/16 | (2006.01) |
| G06F 3/01 | (2006.01) |
| G06F 3/041 | (2006.01) |

(52) U.S. Cl.
CPC ............ *G09G 3/296* (2013.01); *G06F 1/1626* (2013.01); *G06F 3/016* (2013.01); *G06F 3/041* (2013.01); *G09G 2230/00* (2013.01); *G09G 2310/067* (2013.01)

(58) Field of Classification Search
CPC ............ G09G 3/296; G09G 2310/067; G09G 2230/00
USPC ........................................... 345/173, 208
See application file for complete search history.

(56) References Cited

U.S. PATENT DOCUMENTS

| | | |
|---|---|---|
| 2006/0055515 A1 | 3/2006 | Yatsu |
| 2008/0084384 A1 | 4/2008 | Gregorio |
| 2010/0302184 A1 | 12/2010 | East |
| 2010/0309141 A1 | 12/2010 | Cruz-Hernandez |

(Continued)

FOREIGN PATENT DOCUMENTS

| | | |
|---|---|---|
| JP | 2005-149197 A1 | 6/2005 |
| JP | 2006-79135 A1 | 3/2006 |
| JP | 2006-79136 A1 | 3/2006 |
| JP | 2008-521597 A1 | 6/2008 |

(Continued)

OTHER PUBLICATIONS

International Search Report for International Application No. PCT/JP2012/064939 dated Aug. 28, 2012.

*Primary Examiner* — Jennifer Nguyen
(74) *Attorney, Agent, or Firm* — Kratz, Quintos & Hanson, LLP

(57) ABSTRACT

A driving device includes a storage unit configured to store waveform data of driving signals whose phase is shifted by π/2 from a sinusoidal wave satisfying a frequency f1=m/n×f0 (m, n are natural numbers, and m≠n) where a resonance frequency of an actuator is f0, wherein the driving signals excite the actuator for an m number of times and stop exciting the actuator at a point other than a center point of amplitude; and a processor programmed to execute a process including reading the waveform data stored in the storage unit and outputting, to the actuator, the driving signals corresponding to the waveform data that has been read.

6 Claims, 21 Drawing Sheets

(56) References Cited

U.S. PATENT DOCUMENTS

| | | | |
|---|---|---|---|
| 2010/0321315 A1* | 12/2010 | Oda | G06F 3/044 345/173 |
| 2011/0102355 A1 | 5/2011 | Aono | |
| 2011/0148795 A1 | 6/2011 | Aono | |
| 2011/0260991 A1* | 10/2011 | Aono | G06F 3/016 345/173 |
| 2013/0307789 A1* | 11/2013 | Karamath | G06F 3/016 345/173 |

FOREIGN PATENT DOCUMENTS

| | | |
|---|---|---|
| JP | 2010-506499 A1 | 2/2010 |
| JP | 2010-146516 A1 | 7/2010 |
| JP | 2010-287232 A1 | 12/2010 |
| JP | 2011-34150 A1 | 2/2011 |
| JP | 2011-60333 A1 | 3/2011 |
| JP | 2011-507088 A1 | 3/2011 |
| JP | 2011-175364 A1 | 9/2011 |
| WO | WO 2006/071449 A1 | 7/2006 |

\* cited by examiner

LRA (VCM TYPE)
(linear resonant actuator)
(voice coil motor)

LRA (PIEZO TYPE)

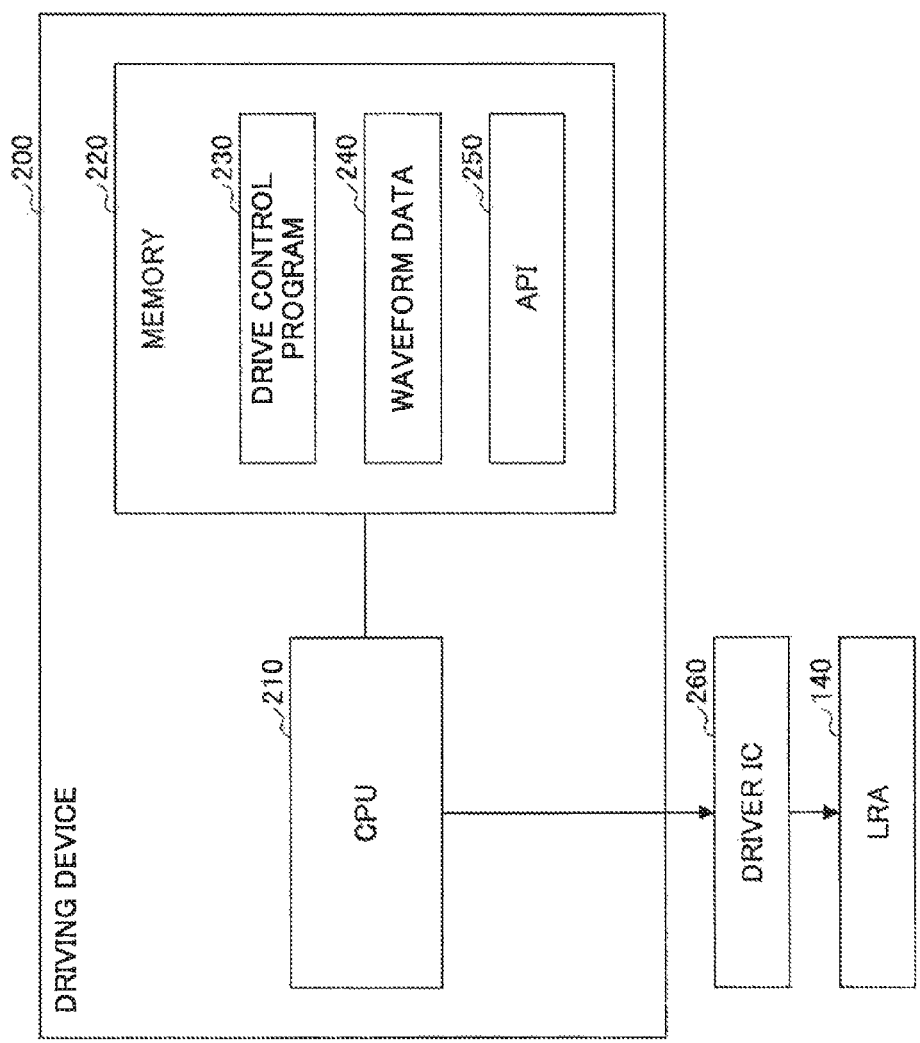

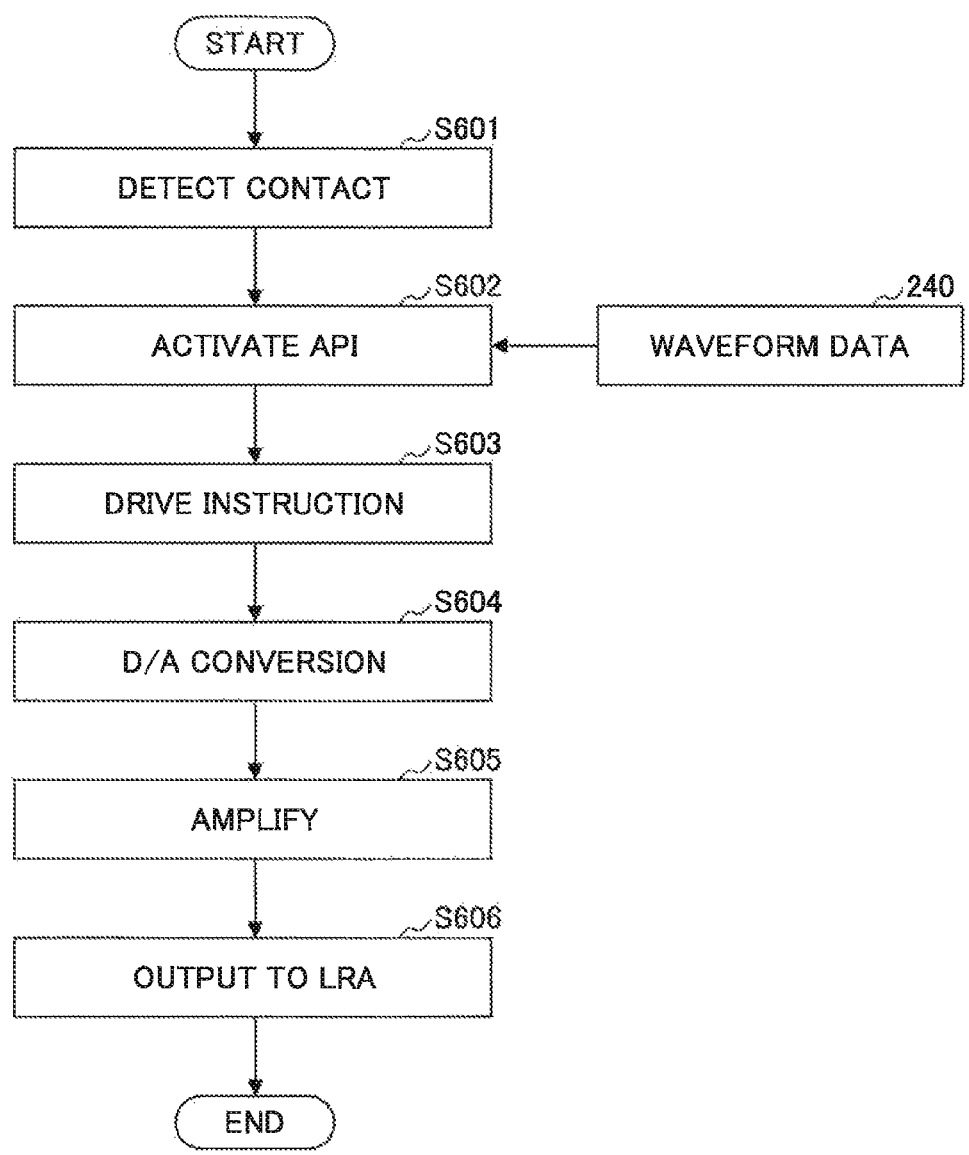

$F = 0.01\sin 2\pi f_1 t \quad f_1 = 350Hz$
$m = 2, n = 1$ $F = 0.01 \sin 2\pi f_1 t \quad f_1 = 337.5 Hz$ $m = 3, n = 2$

DRIVING DEVICE, ELECTRONIC DEVICE, AND DRIVE CONTROL PROGRAM

CROSS-REFERENCE TO RELATED APPLICATION

This application is a U.S. continuation application filed under 35 USC 111(a) claiming benefit under 35 USC 120 and 365(c) of PCT Application PCT/JP2012/064939 filed on Jun. 11, 2012, the entire contents of which are incorporated herein by reference.

FIELD

The embodiments discussed herein are related to a driving device, an electronic device, and a drive control program for driving an actuator.

BACKGROUND

Conventionally, there is an electronic device including a flat touch panel as an input unit. The touch panel is for receiving a touch to the touch panel as an input operation, and no considerations have been made for providing a tactile sensation in accordance with the operation. Therefore, in a conventional touch panel, there has been demanded for installing a device for expressing a tactile sensation in accordance with an operation, Thus, in recent years, for example, considerations have been made to provide a tactile sensation in accordance with an operation by using the vibration caused by a LRA (Linear Resonant Actuator). Furthermore, as the driving method of a LRA, there is an example described in Patent Document 1, and an exclusive-use IC (Integrated Circuit) for controlling a tactile presentation device.

Patent Document 1: Japanese National Publication of International Patent Application No. 2008-521597

However, in the case of a vibration using LRA, the vibration does not immediately stop when the input is stopped. Therefore, for example, it is difficult to express a precipitous tactile sensation caused by an operation of pressing a button of a metal dome type. Furthermore, Patent Document 1 describes a vibration suppressing unit for performing antiphase input after the input of the LRA is stopped; however, the suppression effects have been insufficient. Therefore, by the conventional technology, it has been difficult to appropriately express the differences in tactile sensations in accordance with different types of operations.

SUMMARY

According to an aspect of the embodiments, a driving device includes a storage unit configured to store waveform data of driving signals whose phase is shifted by $\pi/2$ from a sinusoidal wave satisfying a frequency $f1 = m/n \times f0$ (m, n are natural numbers, and $m \neq n$) where a resonance frequency of an actuator is $f0$, wherein the driving signals excite the actuator for an m number of times and stop exciting the actuator at a point other than a center point of amplitude; and a processor programmed to execute a process including reading the waveform data stored in the storage unit and outputting, to the actuator, the driving signals corresponding to the waveform data that has been read.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 5 illustrates a driving device according to an embodiment;
FIG. 6 is a flowchart illustrating the driving of the LRA performed by the driving device according to an embodiment.

DESCRIPTION OF EMBODIMENTS

Figure 1A:
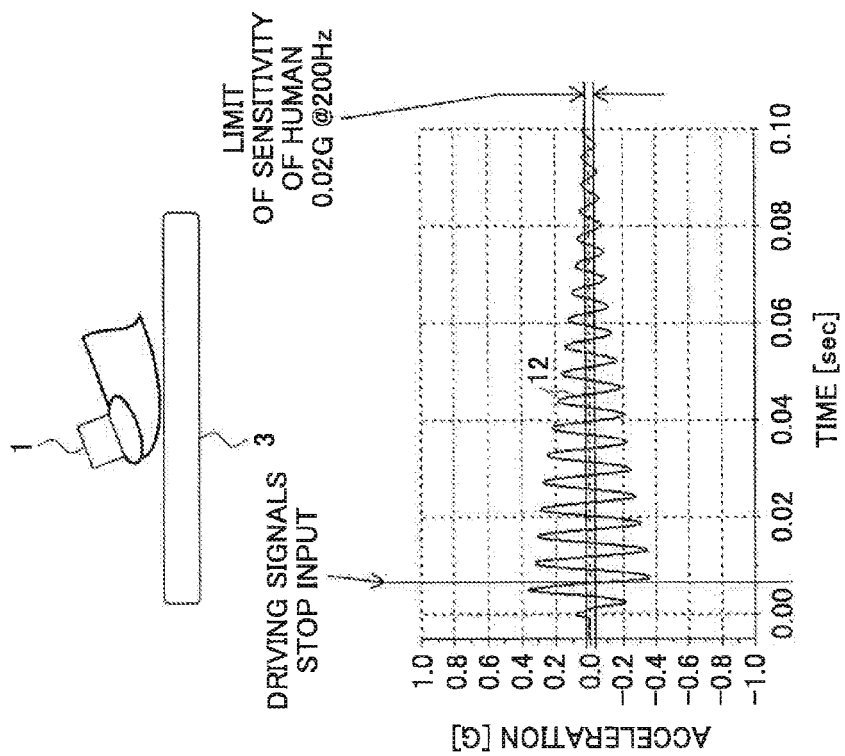
FIGS. 1A and 1B illustrate an overview of an embodiment.
Figure 1B:
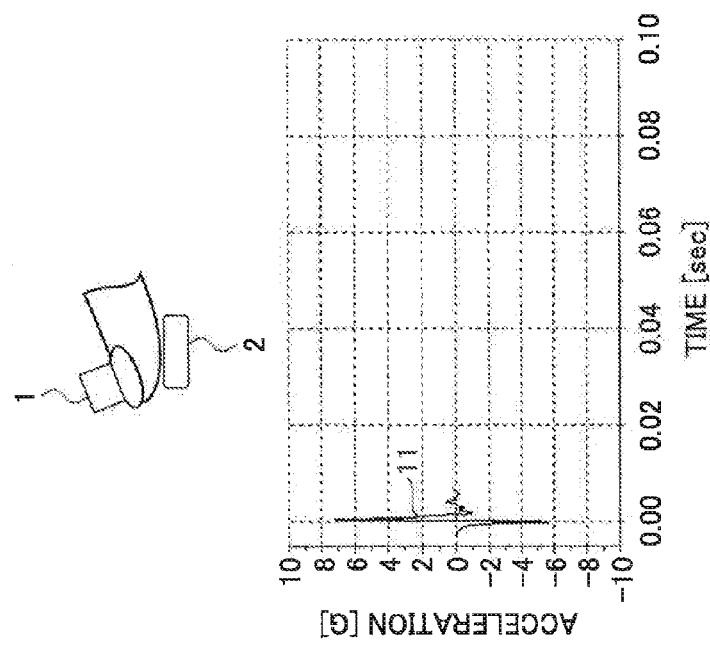

An overview of the present embodiment is described below with reference to FIGS. 1A and 1B. FIGS. 1A and 1B illustrate an overview of the present embodiment.

FIG. 1A illustrates a waveform 11 of acceleration of a vibration that is generated when a button 2 is pressed by a human being's finger to which an acceleration meter 1 is attached. FIG. 1B illustrates a waveform 12 of acceleration of a vibration that is generated when a touch panel 3 to which a LRA (Linear Resonant Actuator) is attached, is touched by a human being's finger to which an acceleration meter 1 is attached. In the example of FIG. 1A, the button 2 is, for example, a button of a metal dome type. Furthermore, the button 2 and the touch panel 3 are provided in an electronic device.

The vibration indicated by the waveform 11 rapidly attenuates in one through several cycles. Meanwhile, the vibration indicated by the waveform 12 continues until the free vibration according to the natural vibration frequency of LRA attenuates, even after the supply of driving signals is stopped.

Figure 2:
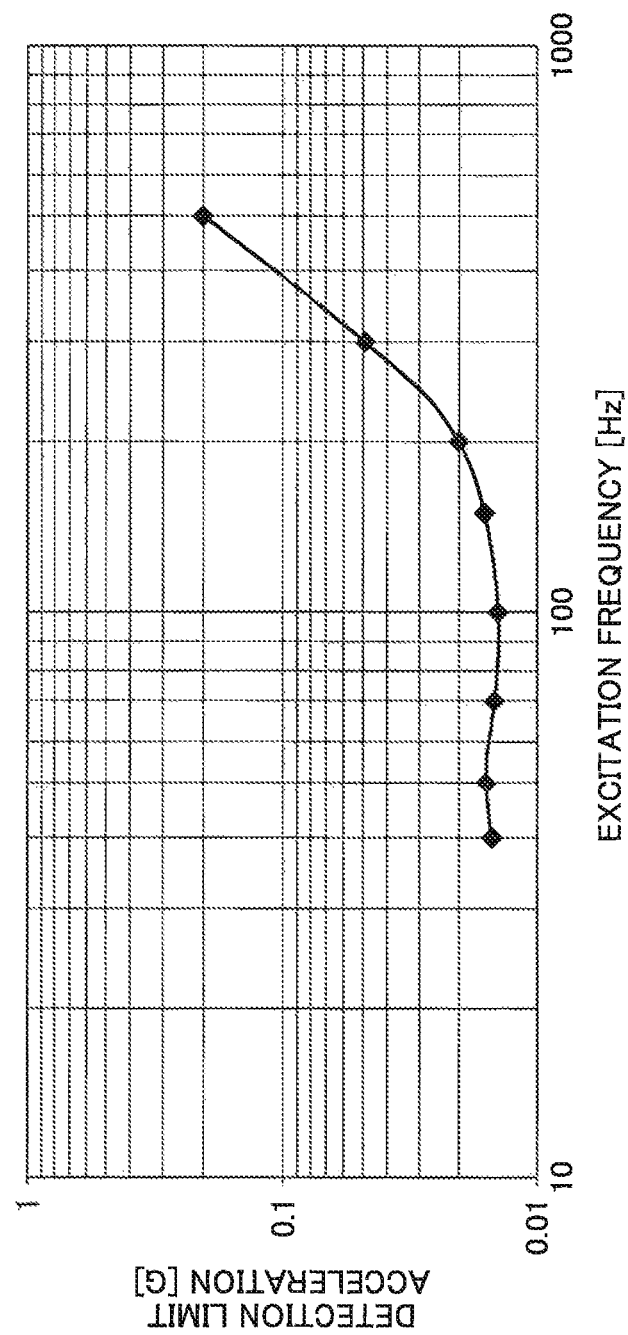
FIG. 2 illustrates the sensitivity of a human's organ for feeling acceleration.

Incidentally, the human fingertip becomes incapable of feeling a vibration, when the acceleration of the vibration becomes less than or equal to 0.02 G in a vibration frequency 200 Hz. The vibration frequency is the number of vibrations per second. The acceleration of the vibration indicates the amount of change in velocity of the vibration per unit time. FIG. 2 illustrates the sensitivity of a human's organ for feeling acceleration. Note that the human's organ for feeling acceleration is the Pacinian corpuscle. The Pacinian corpuscle is one of the four major types of mechanoreceptor mainly found in the skin.

That is to say, with respect to the waveform 11, the finger stops feeling the vibration within 0.01 seconds because the acceleration of vibration becomes less than or equal to 0.02 G. Meanwhile, with respect to the waveform 12, it takes 0.1 second for the acceleration of vibration to become less than or equal to 0.02 G, and therefore the finger continues to feel the vibration until 0.1 second passes. Therefore, the human feels completely different tactile sensations in the case of the vibration indicated by the waveform 11 and in the case of the vibration indicated by the waveform 12.

Thus, in the present embodiment, the pattern of the vibration of LRA has been devised to express a clicking feeling when the button 2 is pressed.

Figure 3:
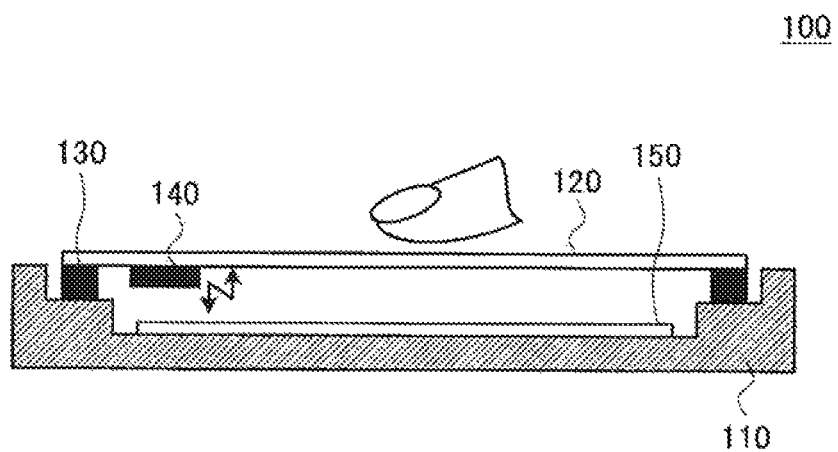
FIG. 3 illustrates an electronic device according to an embodiment.

In the following, a description is given of an electronic device according to the present embodiment with reference to FIG. 3. FIG. 3 illustrates an electronic device according to the present embodiment.

The electronic device according to the present embodiment may be any device having a touch panel including, for example, a display function and an input function, as an input unit. For example, the electronic device according to the present embodiment may be a smartphone, a tablet type computer, or a mobile information terminal.

An electronic device 100 according to the present embodiment includes a case 110, a touch panel 120, a double-sided tape 130, a LRA 140, and a substrate 150.

In the electronic device 100 according to the present, embodiment, the touch panel 120 is fixed to the case 110 by the double-sided tape 130. The LRA 140 is attached to the surface of the touch panel 120 on the side of the case 110. The LRA 140 is formed by combining a vibration system having a resonance frequency designed in advance and an actuator. The LRA 140 is a vibration device for generating a vibration mainly by driving the actuator with the resonance frequency, in which the intensity of vibration changes according to the amplitude of the driving waveform. Note that in the present embodiment, the LRA 140 is the vibration device; however, the vibration device is not limited to a LRA as long as the vibration device has a structure including a resonator and an actuator to be subjected to excitation.

The substrate 150 is arranged inside the case 110. On the substrate 150, a driving device for controlling the driving of the LRA 140 and a driver IC for outputting driving signals to the LRA 140, are mounted.

When the user's finger contacts the touch panel 120, the electronic device 100 according to the present embodiment detects this contact and drives the LRA 140 by the driving device mounted on the substrate 150 and propagates the vibration of the LRA 140 to the touch panel 120.

Note that the electronic device 100 according to the present embodiment may be any device including the touch panel 120 as an input operation unit, and may therefore be a device such as an ATM (Automatic Teller Machine) that is installed and used at a particular location.

Figure 4A:
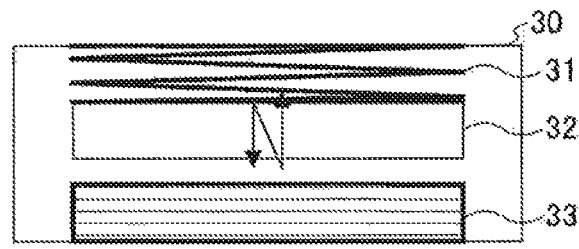
FIGS. 4A and 4B illustrate examples of LRAs.
Figure 4B:
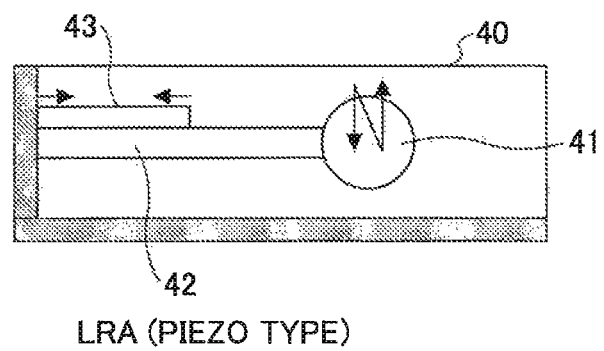

In the following, a description is given of the LRA 140 with reference to FIGS. 4A and 4B. FIGS. 4A and 4B illustrate examples of LRAs. FIG. 4A illustrates an example of a LRA using a voice coil, and FIG. 43 illustrates an example of a LRA using a piezoelectric element.

A LRA 30 illustrated in FIG. 4A includes a spring 31, a magnet 32, and a coil 33. With respect to the LRA 30, the natural vibration frequency f0 is indicated by the following formula 1, where the spring constant of the spring 31 is k, and the mass of the magnet 32 is m.

$$f_0 = \frac{1}{2\pi}\sqrt{\frac{k}{m}}$$ Formula 1

A LRA 40 illustrated in FIG. 4B includes a weight 41, a beam 42, and a piezoelectric element 43. With respect to the LRA 40, a natural vibration frequency f0 is indicated by the following formula 2, where the mass of the weight 41 is m, the Young's modulus of the beam 42 is E, the cross-sectional second moment of the beam 42 is I, and the length in the longitudinal direction of the beam 42 is L.

$$f_0 \approx \frac{1}{2\pi}\sqrt{\frac{3EI}{mL^3}}$$ Formula 2

As the LRA 140 according to the present embodiment, the LRA 30 using a voice coil may be applied, or the LRA 40 using the piezoelectric element 43 may be applied.

Next, with reference to FIG. 5, a description is given of the driving device mounted on the substrate 150 included in the electronic device 100 according to the present embodiment. FIG. 5 illustrates the driving device according to the present embodiment.

A driving device 200 according to the present embodiment includes a CPU (Central Processing Unit) 210 and a memory 220. The CPU 210 performs a process of driving the LRA 140 described below, by reading and executing a drive control program 230 stored in the memory 220. The memory 220 is provided with a storage area storing the drive control program 230 for controlling the driving of the LRA 140, a storage area storing waveform data 240, and a storage area storing an API (Application Programming Interface) 250 for providing a tactile sensation.

The drive control program 230 causes the CPU 210 to execute drive control of the LRA 140. The waveform data 240 is data expressing the waveform of driving signals that are generated in advance for expressing a clicking feeling by a vibration generated by the LRA 140. Details of the waveform data 240 are described below. The API 250 is activated by the drive control program 230, and performs various processes for providing a tactile sensation. In FIG. 5, the API 250 is stored in the memory 220; however, the API 250 may be stored in another memory mounted on the substrate 150.

FIG. 6 is a flowchart illustrating the driving of the LRA 140 performed by the driving device 200 according to the present embodiment.

When the driving device 200 according to the present embodiment detects a contact made with the touch panel 120 (step S601), the driving device 200 activates the API 250 (step S602). Specifically, for example, the driving device 200 may activate the API 250 when a contact is made with a button displayed on the touch panel 120.

The API 250 reads the waveform data 240 stored in the memory 220, and outputs a drive instruction corresponding to the waveform data 240, to a driver IC 260 (step S603). The driver IC 260 receives the drive instruction and performs D/A (Digital to Analog) conversion on the waveform data 240 (step S604), and amplifies the waveform data 240 by an amplifier (step S605). The driver IC 260 outputs the amplified signals to the LRA 140 (step S606).

In the following, a description is given of the waveform data 240 according to the present embodiment. In the present embodiment, two methods are used to change the pattern of the vibration of the LRA 140, and express a clicking feeling.

First, a description is given of the first method. The first method is a method of suppressing the free vibration according to the natural vibration frequency of the LRA 140, which continues after the supply of deriving signals is stopped. In the following description of the present embodiment, the free vibration according to the natural vibration frequency of the LRA 140, which continues after the supply of driving signals is stopped, is referred to as a residual vibration.

In the first method, attention is focused on the fact that when driving signals satisfying a particular condition described below are supplied to the LRA 140, the vibration of the LRA 140 stops in one through several cycles. In the first method, the residual vibration is stopped by applying driving signals satisfying the particular condition to the LRA 140, to generate a vibration that rapidly attenuates in one through several cycles and expresses a clicking feeling.

The driving signals satisfying a particular condition are signals of a frequency f1 of f1=m/n×f0 (m, n are natural numbers, and m≠n), which are used for exciting the LRA 140 for an m number of times, where the natural vibration frequency of the LRA 140 is f0.

Figure 7:
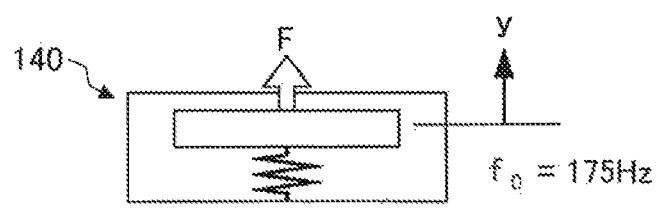
FIG. 7 is a pattern diagram of an example of the LRA.
Figure 8:
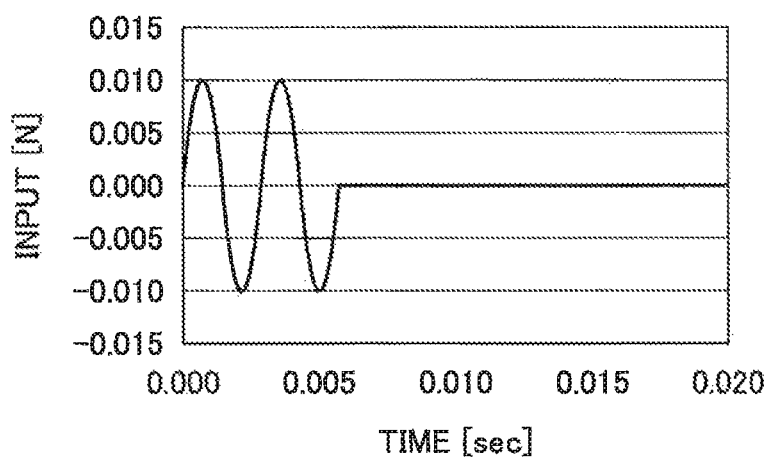
FIG. 8 illustrates an example of an input waveform applied to the LRA.

FIG. 7 is a pattern diagram of an example of the LRA 140, and FIG. 8 illustrates an example of an input waveform applied to the LRA 140.

When the natural vibration frequency f0 of the LRA 140 is 175 Hz, and m=2, n=1, the frequency of the driving signals F becomes a sinusoidal wave of f1=2/1×175=350 Hz. When the frequency of the driving signals F is f1, the driving signals F form a wave from as illustrated in FIG. 8. In the example of FIG. 8, the driving signals are F=0.01 sin 2πf1t.

When the driving signals F are applied to the LRA 140, a vibration of the natural vibration frequency (resonance frequency) f0 of the LRA 140 is generated in the LRA 140. That is to say, in the LRA 140, a synthetic wave is formed by combining the driving signals F of the frequency f1 and the sinusoidal wave of the natural vibration frequency f0 of the LRA 140 is generated, and the LRA 140 is displaced according to this synthetic wave.

Figure 9A:
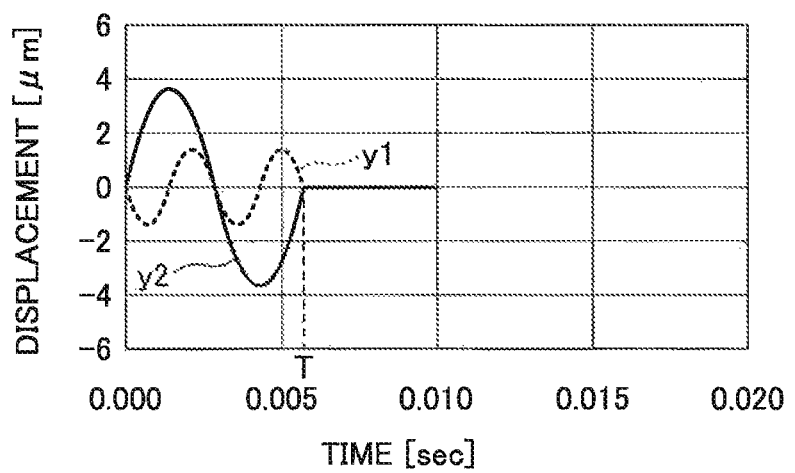
FIGS. 9A and 9B illustrate the displacement of the LRA.
Figure 9B:
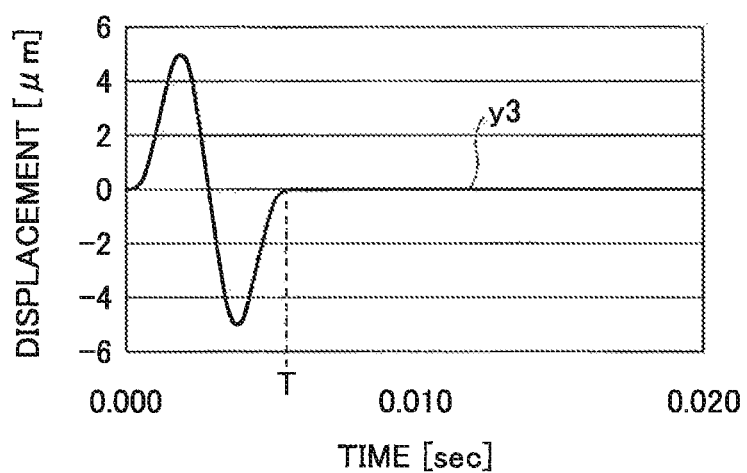

FIGS. 9A and 9B illustrate the displacement of the LRA 140. FIG. 9A is a first diagram illustrating the displacement, and FIG. 9B is a second diagram illustrating the displacement.

In FIG. 9A, the waveform illustrated by the dotted line indicates a forced vibration component y1 of the vibration displacement that occurs in the LRA 140 when the driving signals F are applied to the LRA 140, and the waveform illustrated by the solid line indicates a free vibration component y2. The response displacement y3 when the driving signals F are applied to the LRA 140 is a synthetic wave of the forced vibration component y1 and the free vibration component y2.

FIG. 9B illustrates an example of the response displacement y3. As seen in FIG. 9B, the response displacement y3 becomes zero at a timing T at which the driving signals F become zero.

At the timing T when the response displacement y3 becomes zero, the speed of the vibration and the acceleration of the vibration of the LRA 140 both become zero, and therefore the vibration of the LRA 140 stops.

Figure 10A:
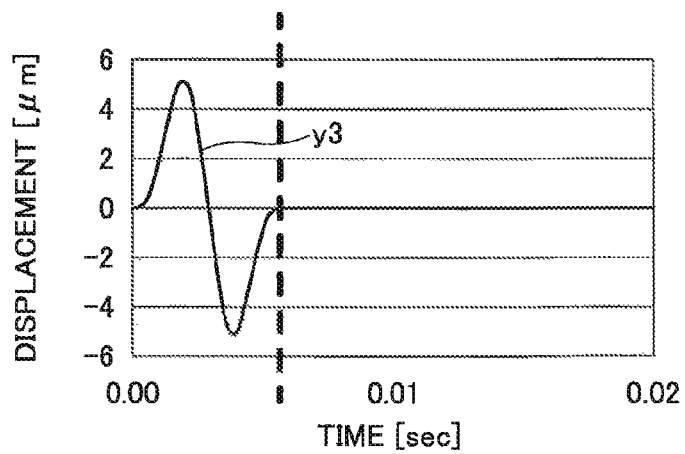
FIGS. 10A through 10C illustrate examples of the speed of the vibration and the acceleration of the vibration of the LRA.
Figure 10B:
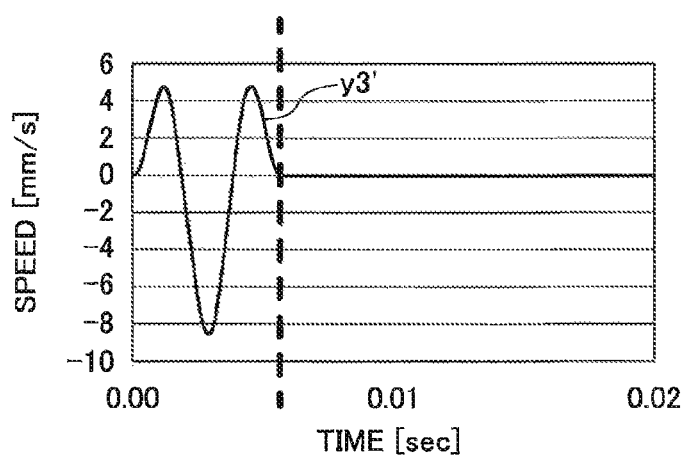
Figure 10C:
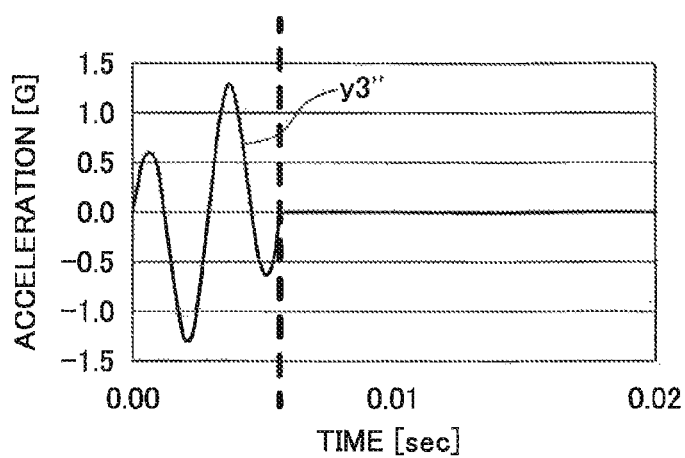

FIGS. 10A through 10C illustrate examples of the speed of the vibration and the acceleration of the vibration of the LRA 140. FIG. 10A illustrates a waveform of a response displacement y3, FIG. 10B illustrates a waveform of a speed waveform y3' that is the first derivative of the response displacement y3, and FIG. 10C illustrates a waveform of an acceleration waveform y3" that is the second derivative of the response displacement y3.

As seen in the example of FIGS. 10A through 10C, the speed waveform y3' and the acceleration waveform y3" become zero at the timing when the response displacement y3 becomes zero. That is to say, the vibration of the LRA 140 stops at the timing T.

At this time, the acceleration waveform y3" stops at two cycles within 0.01 sec. Therefore, in the example of FIGS. 10A through 10C, the acceleration of the vibration becomes less than or equal to 0.02 G within 0.01 sec, and it is possible to express a clicking feeling when the button 2 is pressed.

Figure 11A:
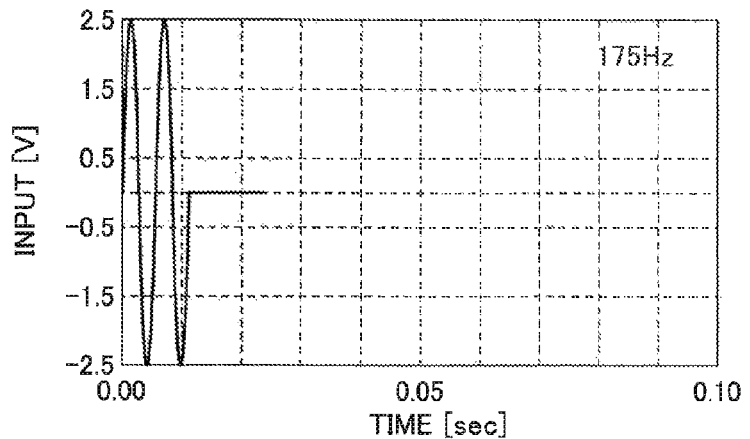
FIGS. 11A through 11C illustrate the acceleration of the vibration of the LRA, when the sinusoidal wave of the natural vibration frequency of the LRA is used as the driving signals.
Figure 11B:
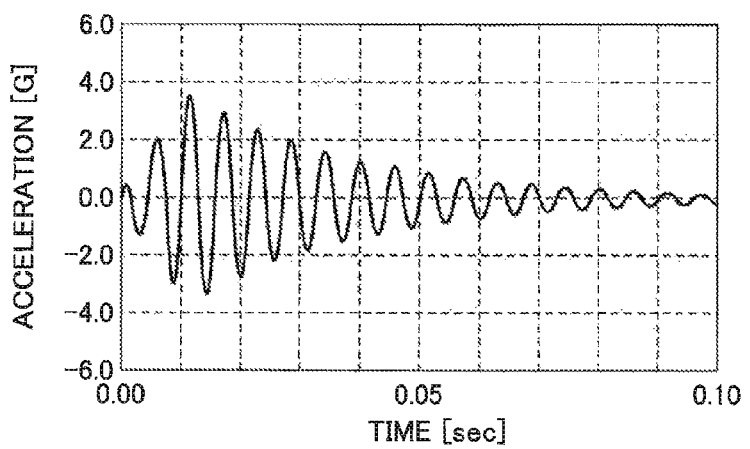
Figure 11C:
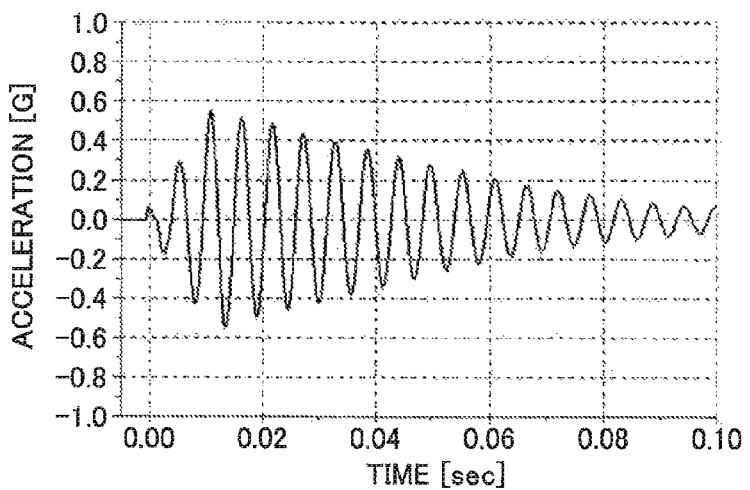

In the following, with reference to FIGS. 11A through 14C, a description is given of effects of the first method described above. FIGS. 11A through 11C illustrate the acceleration of the vibration of the LRA 140, when the sinusoidal wave of the resonance frequency of the LRA 140 is used as the driving signals.

FIG. 11A illustrates driving signals of the sinusoidal wave of the resonance frequency f0=175 Hz of the LRA 140. FIG. 11B illustrates the acceleration of the vibration of the LRA 140 when simulation is performed by using the sinusoidal wave of FIG. 11A as driving signals. FIG. 11C illustrates the acceleration of the vibration of the touch panel 120 when driving signals of FIG. 11A are applied to the LRA 140 in an actual machine in which the LRA 140 having a resonance frequency f0=175 Hz is installed. Note that the acceleration of the vibration of the touch panel 120 is detected by arranging an acceleration meter at the center of the touch panel 120.

As seen in the examples of FIGS. 11B and 11C, when the sinusoidal wave of the resonance frequency f0 is used as the driving signals, the residual vibration occurs for more than 0.1 sec.

Note that in FIG. 11C, in the LRA 140 to which the driving signals are applied, the resonance frequency is f0=175 Hz, the weight of the weight is 1.5 g, and the spring constant supporting the weight is 1813.5 N/m.

Figure 12A:
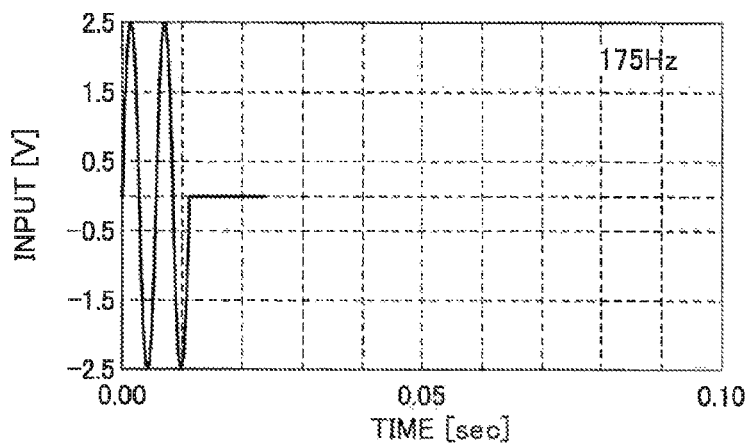
FIGS. 12A and 12B illustrate the acceleration of the vibration of the LRA, when the voltage of the antiphase of the vibration generated in the LRA is applied as vibration suppression signals, after the stopping of the driving signals according to the sinusoidal wave of the natural vibration frequency of the LRA.
Figure 12B:
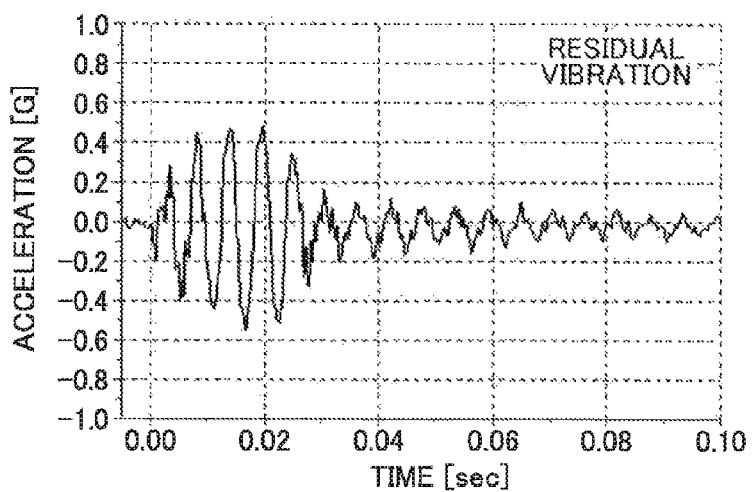

FIGS. 12A and 12B illustrate the acceleration of the vibration of the LRA 140, when the voltage of the antiphase of the vibration generated in the LRA 140 is applied. FIG. 12A illustrates driving signals of the sinusoidal wave of the resonance frequency f0=175 Hz of the LRA 140. FIG. 12B illustrates the acceleration of the vibration of the touch panel 120 in an actual machine in which the LRA 140 is installed, when the sinusoidal wave of FIG. 12A is used as driving signals and a voltage, which is of an antiphase of the vibration that occurs in the LRA 140 after the supply of the driving signals is stopped, is applied.

In the example of FIGS. 12A and 12B, the residual voltage is less than that of FIGS. 11A through 11C; however, it takes more than 0.05 sec until the acceleration of the vibration becomes less than or equal to 0.02 G which is the lower limit of perception by a human being.

Figure 13A:
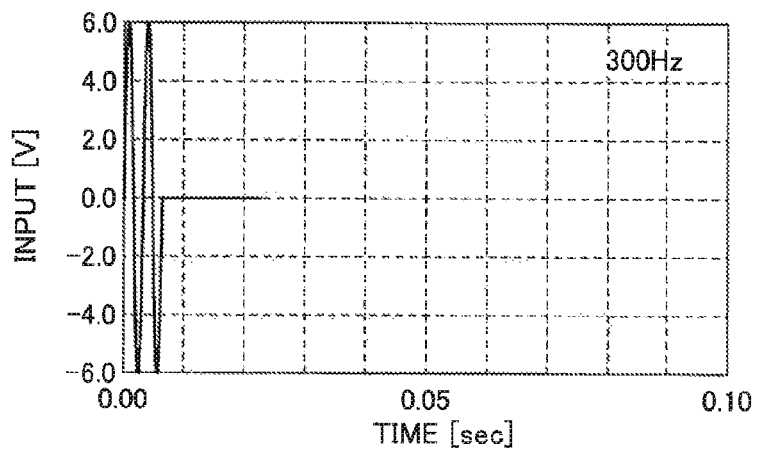
FIGS. 13A through 13C illustrate the acceleration of the vibration of the LRA when signals that do not satisfy the particular condition are used as the driving signals.
Figure 13B:
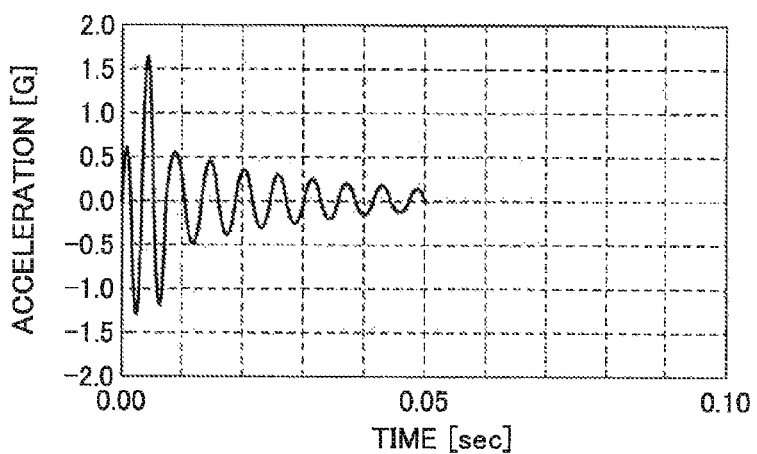
Figure 13C:
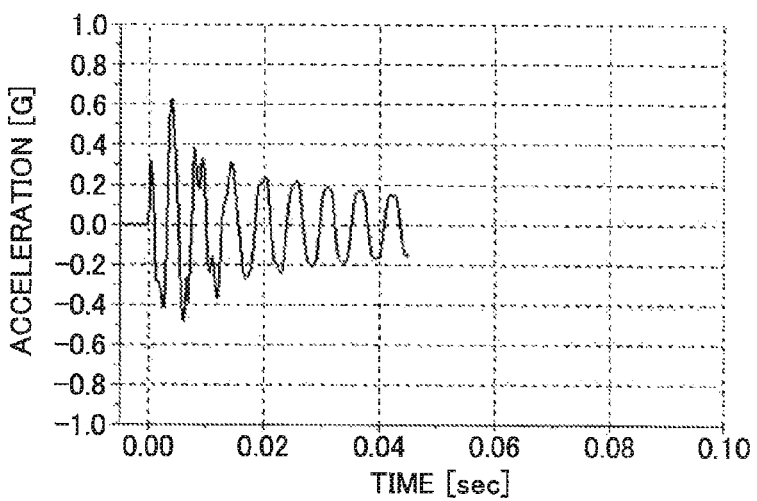

FIGS. 13A through 13C illustrate the acceleration of the vibration of the LRA 140 when signals that do not satisfy the particular condition are used as the driving signals.

FIG. 13A illustrates driving signals of the sinusoidal wave of a frequency 300 Hz that does not satisfy the particular condition. FIG. 13B illustrates the acceleration of the vibration of the LRA 140 when simulation is performed by using the sinusoidal wave of FIG. 13A as driving signals. FIG. 13C illustrates the acceleration of the vibration of the touch panel 120 when driving signals of FIG. 13A are applied to the LRA 140 in an actual machine in which the LRA 140 having a resonance frequency f0=175 Hz is installed. Note that the acceleration of the touch panel 120 is detected by arranging an acceleration meter at the center of the touch panel 120.

As seen in the examples of FIGS. 13B and 13C, when the sinusoidal wave of the frequency that does not satisfy the particular condition is used as the driving signals, the residual vibration occurs for more than 0.04 sec.

Figure 14A:
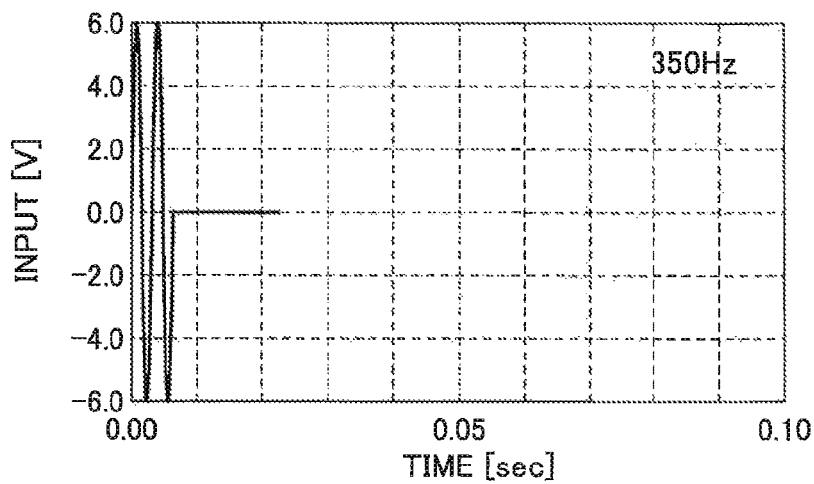
FIGS. 14A through 14C illustrate the acceleration of the vibration of the LRA when signals that satisfy the particular condition are used as the driving signals.
Figure 14B:
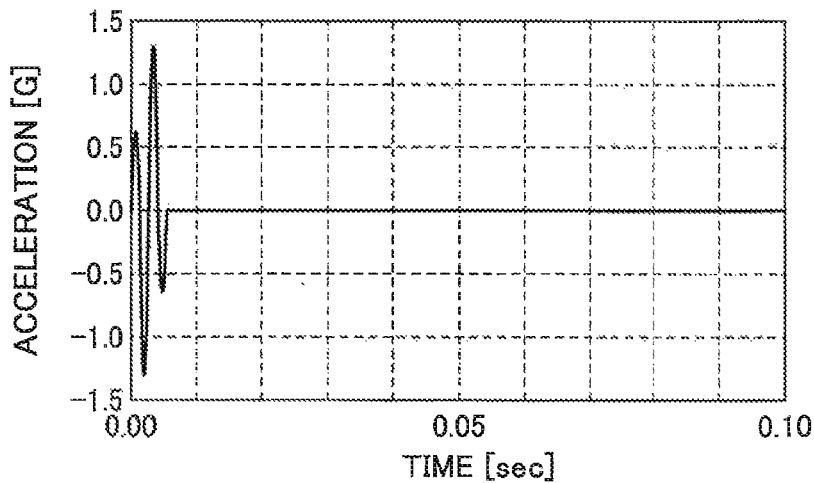
Figure 14C:
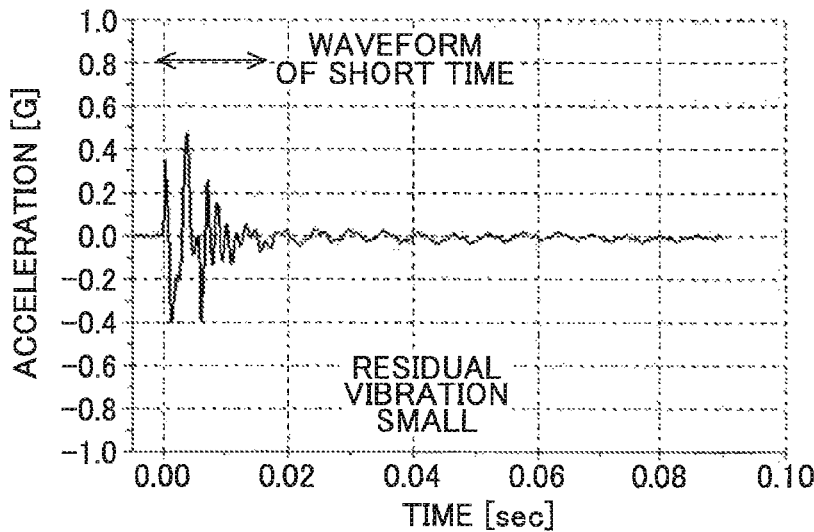

FIGS. 14A through 14C illustrate the acceleration of the vibration of the LRA 140 when signals that satisfy the particular condition are used as the driving signals.

FIG. 14A illustrates driving signals of the sinusoidal wave of a frequency 350 Hz that satisfies the particular condition. FIG. 14B illustrates the acceleration of the vibration of the LRA 140 when simulation is performed by using the sinusoidal wave of FIG. 14A as driving signals. FIG. 14C illustrates the acceleration of the vibration of the touch panel 120 when driving signals of FIG. 14A are applied to the LRA 140 in an actual machine in which the LRA 140 having a resonance frequency f0=175 Hz is installed.

As seen in the examples of FIGS. 14B and 14C, after the passage of 0.02 sec, the acceleration of the residual vibration becomes less than or equal to 0.02 G which is the lower limit of perception, and the wave form of the vibration becomes a waveform of a short time.

According to the above, in the waveform of the vibration according to the LRA 140, when the resonance frequency of the LRA 140 is f0, and signals of a frequency of f1=m/n×f0 (m, n are natural numbers, and m≠n) are used as driving signals for exciting the LRA 140 for an m number of times, it is possible to eliminate a residual vibration. Furthermore, the waveform of the acceleration of the vibration of the touch panel 120 in an actual machine in which the LRA 140 is installed, becomes a waveform of a short time that rapidly attenuates in one through several cycles, and therefore a clicking feeling is expressed.

Note that the natural vibration frequency f0 may be the natural vibration frequency of the LRA 140 after the LRA 140 has been incorporated in the electronic device 100. Furthermore, the frequency f1 is preferably set such that the error with respect to m/n×f0 is less than or equal to 1%. By setting the frequency f1 in this manner, even when a residual vibration occurs after stopping applying the driving signals, the acceleration of the vibration is less than or equal to 0.02 G which is the lower limit of perception by a human being, such that the residual vibration is not perceived by a human being, and therefore the clicking feeling is not lost.

Next, a description is given of the second method of changing the pattern of the vibration of the LRA to express a clicking feeling.

In the second method, attention is focused on the fact that the touch panel 120 itself fixed to the case 110 is also a vibrating body that vibrates at a high frequency. In the second method, driving signals of the LRA 140 are used as signals for stopping the excitation on the LRA 140 at the time point of the peak of the amplitude, and the high-frequency vibration of the touch panel 120 itself is excited to generate a vibration that rapidly attenuates in one through several cycles to express a clicking feeling.

Figure 15A:
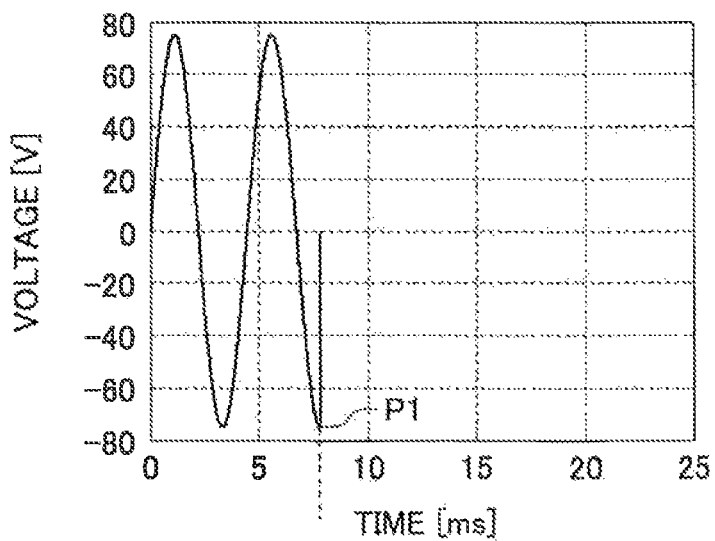
FIGS. 15A and 15B illustrate the excitation of the vibration by the resonance frequency of the touch panel.
Figure 15B:
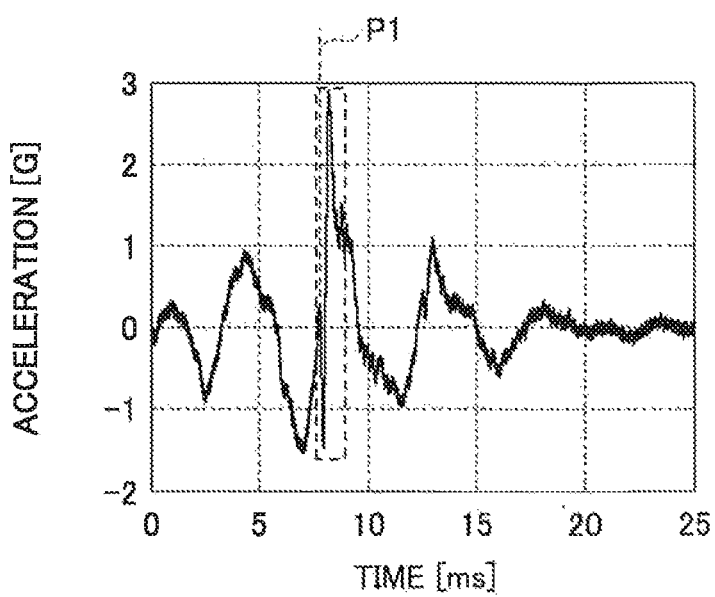

FIGS. 15A and 15B illustrate the excitation of the vibration by the resonance frequency of the touch panel. FIG. 15A illustrates the sinusoidal waveform of the driving signals applied to the LRA 140, and FIG. 15B illustrates the waveform of the acceleration of the vibration of the LRA 140. In the example of FIGS. 15A and 15B illustrate, the driving signal is a voltage. Furthermore, in the example of FIGS. 15A and 15B illustrate, the resonance frequency of the LRA 140 is 225 Hz, and the resonance frequency of the touch panel 120 is 1 kHz. That is to say, the vibration of the LRA 140 is a low frequency vibration, and the vibration of the touch panel 120 is a high frequency vibration. Note that the resonance frequency of the touch panel 120 is the resonance frequency in a state where the four sides of the touch panel 120 are fixed to the case 110.

In the example of FIGS. 15A and 15B, the high frequency vibration of the touch panel 120 is not excited in the ease where the LRA 140 is vibrated at a low frequency of a resonance frequency of 225 Hz. In this state, the vibration of 1 kHz that is the resonance frequency of the touch panel 120 is excited, by removing the vibration of the LRA 140 from the harmonic vibration and applying a rapid force to the touch panel 120.

As illustrated in the example of FIG. 15A, the signals that stop the excitation on the LRA 140 at the point P1 that is the peak of the amplitude, are set as the driving signals. The amplitude of the driving signals illustrated in FIG. 15A become zero, immediately after the excitation on the LRA 140 is stopped. In the example of FIG. 15A, by changing the amplitude of the driving signals from the peak to zero, the vibration of the LRA 140 is removed from the harmonic vibration.

Furthermore, in the example of FIGS. 15A and 15B, the driving time of the LRA 140 by the driving signals is set to be a cycle of 7/4, such that the point P1 of the peak of the amplitude becomes the end of the driving signals. The end of the driving signals is the point where excitation on the LRA 140 is stopped.

As a result, as illustrated in FIG. 15B, a high frequency vibration having a frequency of 1 kHz is excited at point P1, and a vibration that rapidly attenuates in one through several cycles is generated. Furthermore, in the example of FIGS. 15A and 15B, by exciting a high frequency vibration at point P1, the timings of the maximum value of the acceleration in the low frequency vibration and the maximum value of the acceleration in the high frequency vibration are matched and superposed, and therefore a precipitous peak having a higher intensity is generated within a short period of time. As described above, by the second method, by generating a precipitous peak within a short time in the acceleration of the vibration, it is possible to provide an acute tactile sensation and express a clicking feeling.

Figure 16:
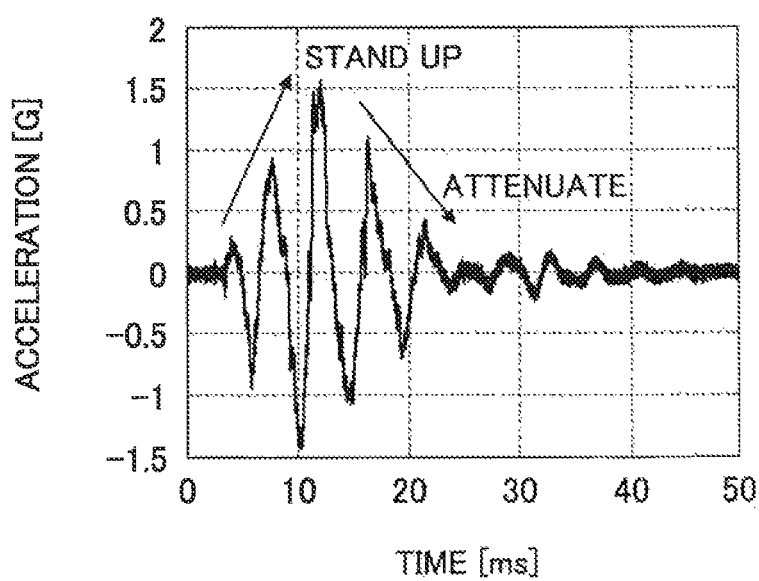
FIG. 16 illustrates the acceleration of the vibration of the touch panel when the voltage of the resonance frequency of the LRA is used as the driving signals.

In the following, the effects of the second method described above are described with reference to FIG. 16. FIG. 16 illustrates the acceleration of the vibration of the touch panel when the voltage of the resonance frequency of the LRA is used as the driving signals. The example of FIG. 16 illustrates the acceleration of the vibration of the touch panel 120, when an attempt is made to express a clicking feeling by reducing the driving time of the LRA 140.

However, even if the driving time of the LRA 140 is reduced, the vibration of the touch panel 120 continues for several cycles, because the stand-up time for amplifying the vibration and the time until the acceleration of the amplified vibration attenuates to less than or equal to 0.02 G, are needed. In the example of FIG. 16, it takes approximately 25 ms from the stand-up to the attenuation, and the vibration continues for approximately four cycles. Therefore, it is difficult to provide an acute tactile sensation like a clicking feeling.

Conversely, in FIG. 15B, a vibration having a frequency of 1 kHz is rapidly standing up, and the vibration attenuates within approximately two cycles.

Thus, in the second method, it is possible to express a clicking feeling by generating a precipitous tactile sensation within a short period of time in the acceleration of the vibration.

Note that in the example of FIGS. 15A and 15B, a high frequency vibration is excited at the point P1 that is the end of the driving signals, and the acceleration of the high frequency vibration reaches a peak at ¾ cycles. Meanwhile, the acceleration of the low frequency vibration reaches a peak at ¼ cycle form the point P1. Therefore, the timing when the acceleration of the high frequency vibration reaches a peak is slightly shifted from the timing when the acceleration of the low frequency vibration reaches a peak.

Figure 17A:
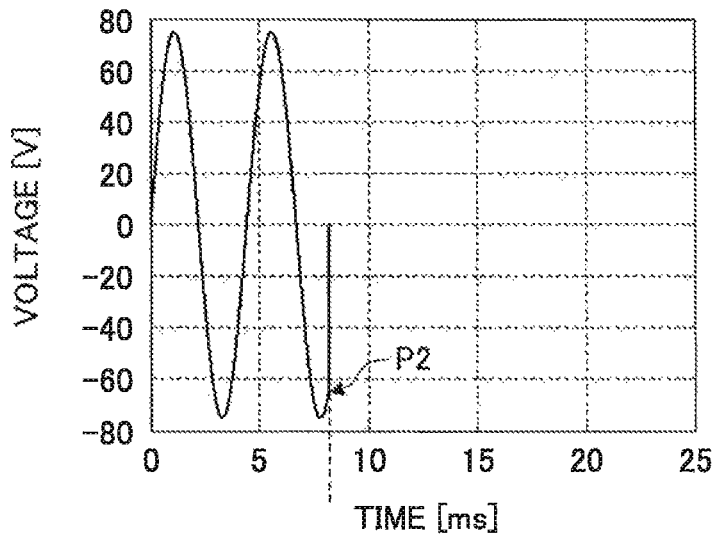
FIGS. 17A and 17B illustrate examples where the point of exciting the high frequency vibration is shifted.
Figure 17B:
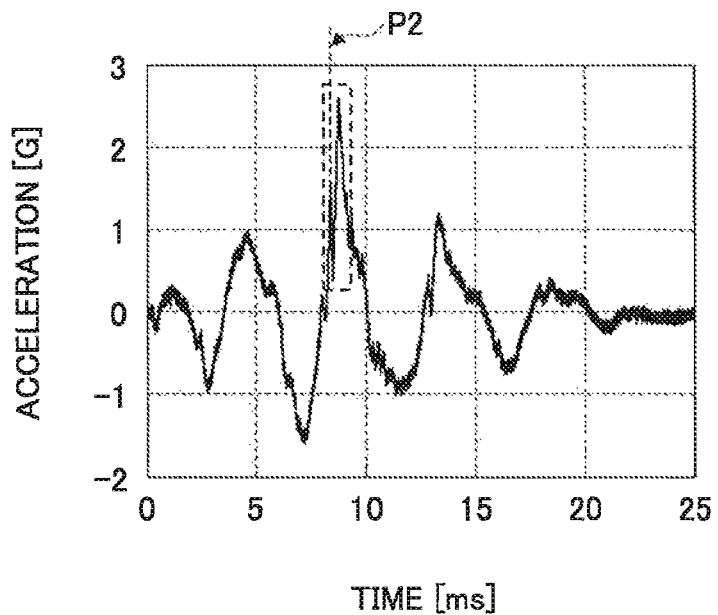

In the second method, in order to eliminate this shift of timing, the point of exciting the high frequency vibration may be shifted from point P1. FIGS. 17A and 17B illustrate examples where the point of exciting the high frequency vibration is shifted. FIG. 17A illustrates a sinusoidal waveform of driving signals applied to the LRA 140, and FIG. 17B illustrates a waveform of the acceleration of the vibration of the LRA 140.

In FIG. 17A, in the driving signals, a point P2 that is slightly shifted from the peak of the amplitude is the end. In FIG. 17B, the end P2 of the driving signals is shifted from the peak of the amplitude, and therefore the amplitude of the acceleration of the high frequency vibration that is superposed becomes lower than the maximum value, and the peak of the acceleration of the high frequency vibration in a state where the acceleration of the high frequency vibration and the acceleration of the low frequency vibration are superposed, is lower than the value indicated in FIG. 15B, but the same effects as those of FIGS. 15A and 15B are achieved.

In the driving device 200 according to the present embodiment, the waveform of the driving signals of the LRA 140 generated by using the first method and the second method, is saved in the memory 220 as waveform data 240.

In the following, a description is given of driving signals according to the present embodiment. In the present embodiment, signals which satisfy the particular condition described in the first method, and in which the point of the peak of the amplitude is the end of the signals as described in the second method, are used as the driving signals.

Figure 18A:
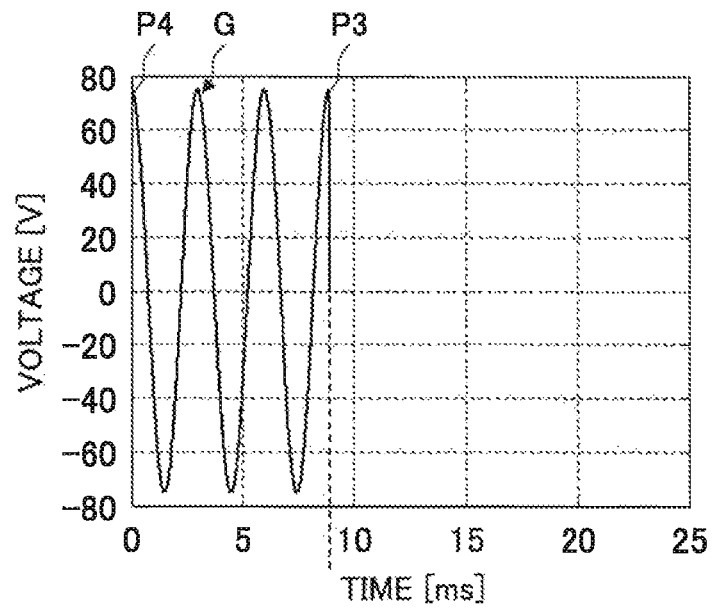
FIGS. 18A and 18B illustrate an example of driving signals of the LRA according to an embodiment.
Figure 18B:
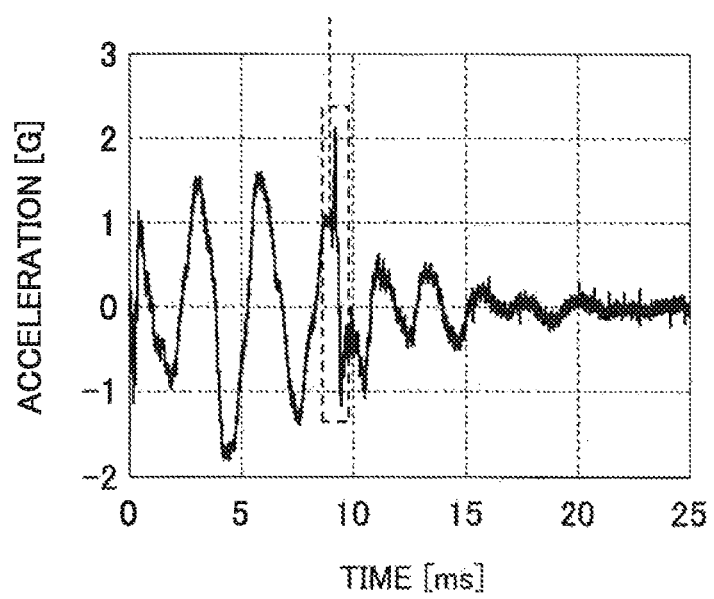

FIGS. 18A and 18B illustrate an example of driving signals of the LRA 140 according to the present embodiment. FIG. 18A illustrates a waveform of driving signals G according to the present embodiment, and FIG. 18B illustrates the acceleration of the vibration of the touch panel 120 when the driving signals G according to the present embodiment are applied to the LRA 140.

The driving signals G according to the present embodiment are signals of a frequency of f1=m/n×f0 (m, n are natural numbers, and m≠n), which are used for exciting the LRA 140, and which excite the actuator for an m number of times. In the example of FIGS. 18A and 18B, m=3, n=2. Furthermore, in the driving signals G according to the present embodiment, the point P3 where the amplitude is the maximum value, is the end of the driving signals G.

In the present embodiment, in order to set the driving signals G as signals of m cycles and signals in which the peak of the amplitude is the end, the driving signals G are set as a cosine wave that is shifted from the sinusoidal wave by a phase of π/2. In the present embodiment, by setting the driving signals G as a cosine wave, the driving signals G are set as signals that satisfy the particular condition and in which the end is the peak of the amplitude.

Note that in the electronic device 100 according to the present embodiment, the LRA 140 is attached to the touch panel 120, and therefore the resonance frequency of the touch panel 120 is the resonance frequency in a state where the four sides of the touch panel 120 are fixed to the case 110. For example, the resonance frequency of the touch panel 120 is the resonance frequency in a state where the touch panel 120 is incorporated in the case 110, in the case where the LRA 140 is arranged inside the case 110.

For example, the waveform data 240 of the driving device 200 according to the present embodiment is data expressing the waveform of the driving signals G. Specifically, for example, the waveform data 240 includes the frequency f1, the amplitude, the phase, the cycle (value of m), etc., of the driving signals G. Furthermore, the waveform data 240 according to the present embodiment may include a formula expressing the waveform of the driving signals G.

In step S603 of FIG. 6, the driving device 200 according to the present embodiment reads the waveform data 240 indicating the driving signals G by the API 250, and outputs a driving instruction corresponding to the waveform data 240 to the driver IC 260. The driver IC 260 performs D/A conversion on the waveform data 240 and amplifies the waveform data 240, and outputs the waveform data 240 to the LRA 140.

A description is given of a case where the driving signals G are applied to the LRA 140 in the driving device 200 according to the present embodiment.

Figure 19:
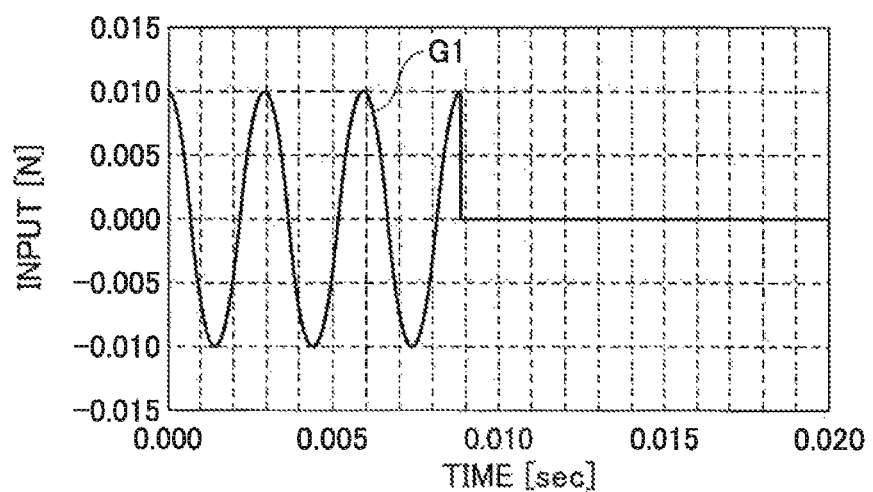
FIG. 19 illustrates a waveform input to the LRA according to an embodiment.

FIG. 19 illustrates a waveform input to the LRA 140 according to the present embodiment. The waveform illustrated in FIG. 19 indicates the force applied to the LRA 140 by applying the driving signals G to the LRA 140.

In the present embodiment, the frequency f1 of the driving signals G is f1=3/2×225=337.5 Hz, when the natural vibration frequency f0 of the LRA 140 is 225 Hz, and m=3, n=2. The waveform illustrated in FIG. 19 is a cosine wave G1 that is shifted from a sinusoidal wave F by a phase of π/2, when the frequency of the driving signals G is f1. The sinusoidal wave F is obtained by F=0.01 sin 2πf1t.

When the cosine wave G1 is applied to the LRA 140, a vibration of the natural vibration frequency f0 (i.e., the resonance frequency) of the LRA 140 is generated in the LRA 140. That, is to say, in the LRA 140, a synthetic wave is formed by combining the cosine wave G1 of the frequency f1 and a cosine wave of the natural vibration frequency f0 of the LRA 140, and the LRA 140 is displaced according to this synthetic wave.

Figure 20A:
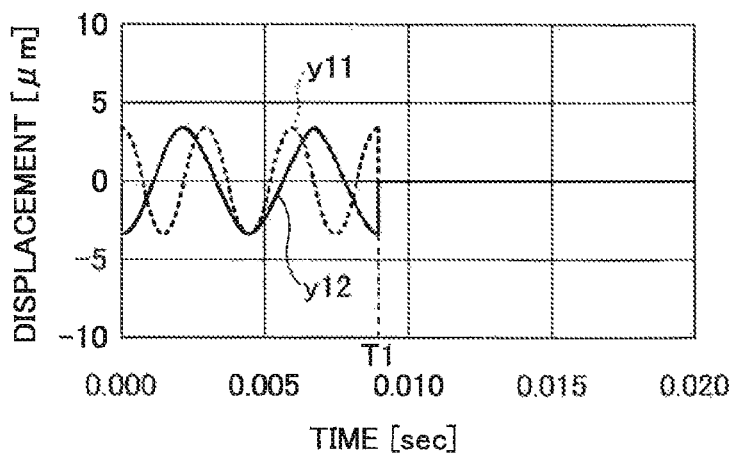
FIGS. 20A and 20B illustrate the displacement of the LRA according to an embodiment.
Figure 20B:
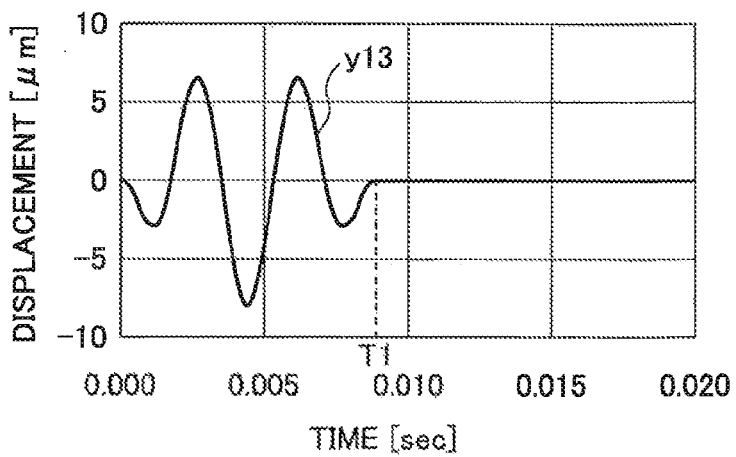

FIGS. 20A and 20B illustrate the displacement of the LRA 140 according to the present embodiment. FIG. 20A is a first diagram illustrating the displacement, and FIG. 20B is a second diagram illustrating the displacement.

In FIG. 20A, the waveform illustrated by the dotted line indicates a forced vibration component y11 of the vibration displacement that occurs in the LRA 140 when the cosine wave G1 is applied to the LRA 140, and the waveform illustrated by the solid line indicates a free vibration component y12. A response displacement y13 of the LRA 140 when the cosine wave G1 is applied to the LRA 140 is a synthetic wave of the forced vibration component y11 and the free vibration component y12.

FIG. 20B illustrates an example of the response displacement y13. As seen in FIG. 20B, the response displacement y13 becomes zero at a timing T1 at which the cosine wave G1 becomes zero.

At the timing T1 when the response displacement y13 becomes zero, the speed of the vibration of the LRA 140 becomes zero, and therefore the vibration of the LRA 140 stops.

Figure 21A:
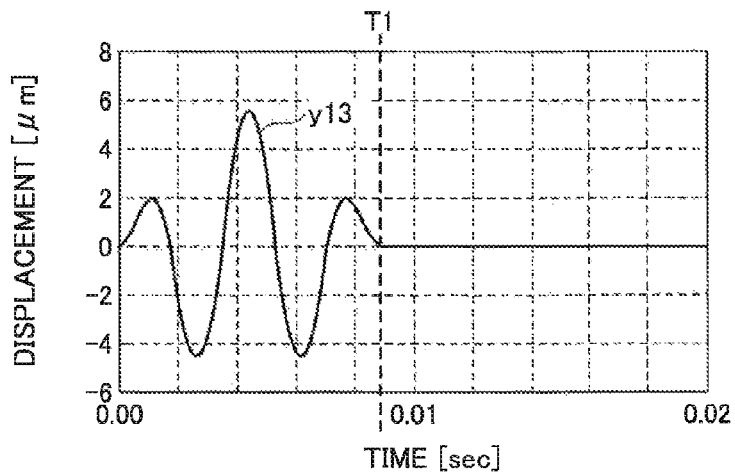
FIGS. 21A through 21C illustrate examples of the speed of the vibration and the acceleration of the vibration of the LRA according to an embodiment.
Figure 21B:
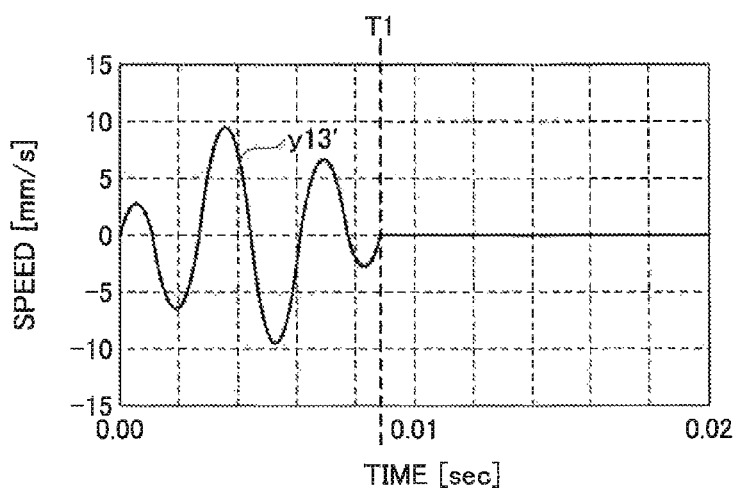
Figure 21C:
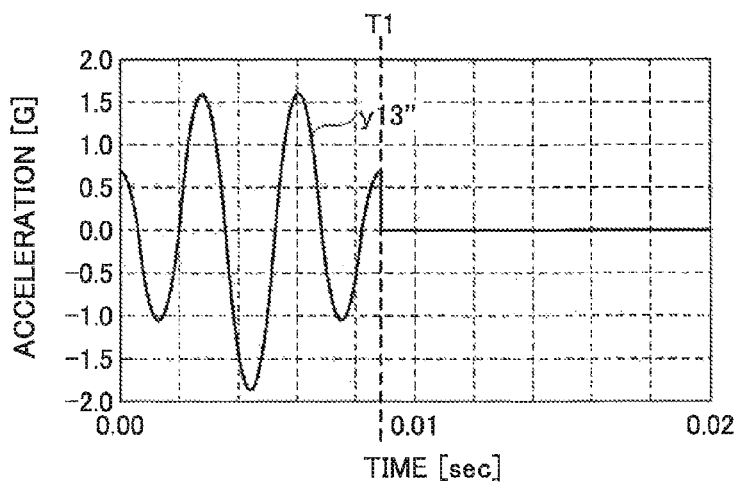

FIGS. 21A through 21C illustrate examples of the speed of the vibration and the acceleration of the vibration of the LRA 140 according to the present embodiment. FIG. 21A illustrates the response displacement y13, FIG. 21B illustrates a waveform of a speed waveform y13' that is the first derivative of the response displacement y13, and FIG. 21C illustrate a waveform of an acceleration waveform y13'' that is the second derivative of the response displacement y13.

As seen in the example of FIGS. 21A through 21C, the speed waveform y13' and the acceleration waveform y13'' become zero at the timing T1 when the response displacement y13 becomes zero. That is to say, the vibration of the LRA 140 stops at the timing T1.

At this time, the acceleration waveform y13'' stops at three cycles within 0.01 sec. Therefore, in the present embodiment, the acceleration of the vibration becomes less than or equal to 0.02 G within 0.01 sec, and it is possible to express a clicking feeling when the button 2 of the metal dome type is pressed.

Note that in the present embodiment, the excitation is stopped at a point of the peak of the amplitude of the cosine wave G1; however, the present embodiment is not so limited. In the present embodiment, for example, the end of the driving signals may be any point where it is possible to generate a precipitous peak expressing a clicking feeling, in the waveform indicating the acceleration of the vibration of the touch panel 120. In the present embodiment, the end of the driving signals may be any point other than zero that is the center point of the amplitude; the end of the driving signals is preferably a point near the peak of the amplitude.

Furthermore, in the electronic device 100 according to the present embodiment, the LRA 140 is attached to the surface of the touch panel 120 on the side of the case; however, the present embodiment is not so limited. For example, the LRA 140 may be arranged near the substrate 150 arranged inside the case 110.

Figure 22:
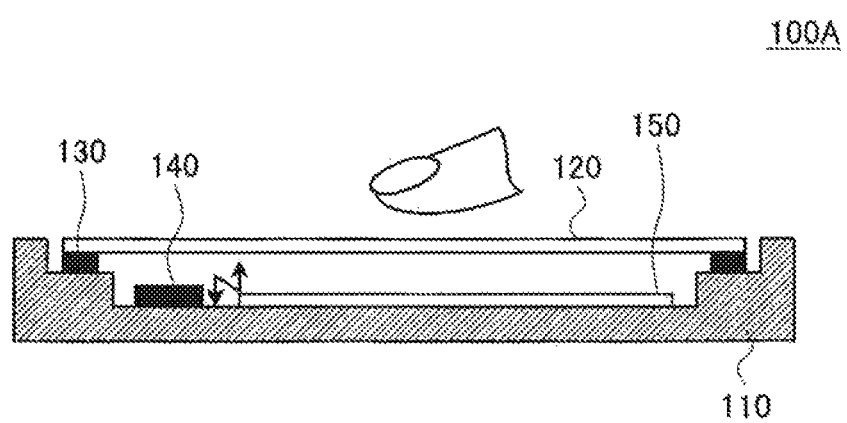
FIG. 22 illustrates an example of an electronic device in which the LRA is provided in a case.

FIG. 22 illustrates an example of an electronic device 100A in which the LRA 140 is provided in the case. In the electronic device 100A illustrated in FIG. 22, the LRA 140 is arranged near the substrate 150 provided inside the case 110.

The present embodiment is also applicable to the electronic device 100A. Furthermore, when the present embodiment is applied, to the electronic device 100A, it is possible to express a clicking feeling when the button 2 of the metal dome type is pressed, similar to the case of the electronic device 100 according to the present embodiment.

According to an aspect of the embodiments, a tactile sensation in accordance with an operation is provided.

The driving device, the electronic device, and the drive control program are not limited to the specific embodiments described herein, and variations and modifications may be made without departing from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A driving device comprising:
   a storage unit configured to store waveform data of driving signals whose phase is shifted by $\pi/2$ from a sinusoidal wave satisfying a frequency f1=m/n×f0 (m, n are natural numbers, and m≠n) where a resonance frequency of an actuator is f0, wherein the driving signals excite the actuator for an m number of times and stop exciting the actuator at a point otter than a center point of amplitude; and
   a processor programmed to execute a process including reading the waveform data stored in the storage unit and outputting, to the actuator, the driving signals corresponding to the waveform data that has been read.

2. The driving device according to claim 1, wherein the driving signals stop exciting the actuator at a peak of the amplitude.

3. The driving device according to claim 1, wherein the frequency f1 satisfies f1=m/n×f0 (m, n are natural numbers, m>n).

4. An electronic device comprising:
   a touch panel;
   an actuator configured to vibrate the touch panel, the actuator having a resonance frequency f0; and
   a driving device including
      a storage unit configured to store waveform data of driving signals whose phase is shifted by $\pi/2$ from a sinusoidal wave satisfying a frequency f1=m/n×f0 (m, n are natural numbers, and m≠n), wherein the driving signals excite the actuator for an m number of times and stop exciting the actuator at a point other than a center point of amplitude, and
      a processor programmed to execute a process including reading the waveform data stored in the storage unit and outputting, to the actuator, the driving signals corresponding to the waveform data that has been read.

5. A non-transitory computer-readable recording medium storing a drive control program that causes a computer to execute a process, the process comprising:
   reading waveform data from a storage unit storing the waveform data of driving signals whose phase is shifted by $\pi/2$ from a sinusoidal wave satisfying a frequency f1=m/n×f0 (m, n are natural numbers, and m≠n) where a resonance frequency of an actuator is f0, wherein the driving signals excite the actuator for an m number of times and stop exciting the actuator at a point other than a center point of amplitude; and
   outputting, to the actuator, the driving signals corresponding to the waveform data that has been read.

6. A drive control method executed by a computer, the method comprising:
   reading waveform data from a storage unit storing the waveform data or driving signals whose phase is shifted by $\pi/2$ from a sinusoidal wave satisfying a frequency f1=m/n×f0 (m, n are natural numbers, and m≠n) where a resonance frequency of an actuator is f0, wherein the driving signals excite the actuator for an m number of times and stop exciting the actuator at a point other than a center point of amplitude; and outputting, to the actuator, the driving signals corresponding to the waveform data that has been read.

* * * * *